(12) United States Patent
Makino et al.

(10) Patent No.: US 11,192,825 B2
(45) Date of Patent: Dec. 7, 2021

(54) REFRACTORY PRODUCT FOR CASTING OF STEEL, AND PLATE FOR SLIDING NOZZLE DEVICE

(71) Applicant: KROSAKIHARIMA CORPORATION, Fukuoka (JP)

(72) Inventors: Tarou Makino, Fukuoka (JP); Shuuji Noai, Fukuoka (JP); Keiichirou Akamine, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 93 days.

(21) Appl. No.: 16/487,591

(22) PCT Filed: Jan. 19, 2018

(86) PCT No.: PCT/JP2018/001642
§ 371 (c)(1),
(2) Date: Aug. 21, 2019

(87) PCT Pub. No.: WO2018/155030
PCT Pub. Date: Aug. 30, 2018

(65) Prior Publication Data
US 2019/0382313 A1    Dec. 19, 2019

(30) Foreign Application Priority Data
Feb. 22, 2017    (JP) .................. JP2017-30628

(51) Int. Cl.
*B22D 11/10*    (2006.01)
*C04B 35/101*    (2006.01)
*B22D 41/32*    (2006.01)

(52) U.S. Cl.
CPC .......... *C04B 35/101* (2013.01); *B22D 11/10* (2013.01); *B22D 41/32* (2013.01)

(58) Field of Classification Search
CPC ........ B22D 11/10; B22D 41/32; C04B 35/101
See application file for complete search history.

(56) References Cited

U.S. PATENT DOCUMENTS

| 4,104,075 A * | 8/1978 | Hayashi ............... C04B 35/101 |
| | | 501/107 |
| 2010/0004114 A1* | 1/2010 | Djuricic ............... C04B 35/482 |
| | | 501/87 |

(Continued)

FOREIGN PATENT DOCUMENTS

| JP | 55-107749 A | 8/1980 |
| JP | 60-029664 B2 | 7/1985 |

(Continued)

OTHER PUBLICATIONS

International Search Report dated Apr. 6, 2018 for PCT/JP2018/001642 filed Jan. 19, 2018.

(Continued)

*Primary Examiner* — Scott R Kastler
(74) *Attorney, Agent, or Firm* — Paul D. Bianco; Gary S. Winer; Fleit Intellectual Property Law

(57) ABSTRACT

Disclosed is a refractory product for casting of steel, which is capable of forming a dense surface layer which is high in terms of a slag infiltration suppressing ability and strong, in a surface region thereof efficiently or sufficiently or in an optimum state. The refractory product contains 1 mass % or more of free carbon, and 2 mass % to 15 mass % of an aluminum component as metal, with the remainder comprising a refractory material as a main composition, wherein the refractory product has a permeability of $1\times10^{-16}$ $m^2$ to $15\times10^{-16} m^2$.

16 Claims, 10 Drawing Sheets

(56) References Cited

U.S. PATENT DOCUMENTS

2016/0361758 A1   12/2016  Makino et al.
2019/0382313 A1*  12/2019  Makino ................ C04B 35/106

FOREIGN PATENT DOCUMENTS

| JP | 63-285168  A  | 11/1988 |
| JP | 10-245282  A  | 9/1998  |
| JP | 11-199313  A  | 7/1999  |
| WO | 2015/129745 A1 | 9/2015 |

OTHER PUBLICATIONS

Written Opinion dated Apr. 1, 2018 PCT/JP2018/001642 filed Jan. 19, 2018.
English translation of International Preliminary Report on Patentability dated Aug. 27, 2019 with Written Opinion for PCT/JP2018/001642, filed Jan. 19, 2018.

* cited by examiner

TABLE 1

| | Comparative Sample 1 | Comparative Sample 2 | Inventive Sample 1 | Inventive Sample 2 | Inventive Sample 3 | Inventive Sample 4 | Inventive Sample 5 | Comparative Sample 3 |
|---|---|---|---|---|---|---|---|---|
| Addition Amount of Al (mass%) | 0 | 3 | 4 | 6 | 9 | 12 | 23 | 25 |
| Heat Treatment Temperature (°C) | 800 | 800 | 800 | 800 | 800 | 800 | 800 | 800 |
| $Al_2O_3$ (mass%) | 95 | 93 | 93 | 91 | 89 | 87 | 80 | 78 |
| Al (mass%) | 0 | 1.7 | 2 | 3.7 | 5.7 | 7.7 | 15 | 16.2 |
| F.C. (mass%) | 4 | 4 | 4 | 4 | 4 | 4 | 4 | 4 |
| Others (mass%) | 1 | 1.3 | 1 | 1.3 | 1.3 | 1.3 | 1 | 1.8 |
| Bulk Specific Gravity | 3.3 | 3.3 | 3.2 | 3.2 | 3.2 | 3.2 | 3.1 | 3.1 |
| Apparent Porosity (%) | 12.2 | 11 | 10.7 | 10.4 | 9.8 | 10 | 11.2 | 13 |
| Permeability ($\times 10^{-16}$ m$^2$) | 5.9 | 3.6 | 2.6 | 1.3 | 1.1 | 1.5 | 2.7 | 3.3 |
| Presence or Absence of Dense Surface Layer after Heat Treatment in Carbonaceous Material at 1500°C | × | × | ○ | ○ | ○ | ○ | ○ | ○ |
| Presence or Absence of Crack | ○ | ○ | ○ | ○ | ○ | ○ | ○ | × |
| Thermal Shock Resistance Test | ○ | ○ | ○ | ○ | ○ | ○ | ○ | × |
| Attack Resistance Test | × | × | ○ | ○ | ○ | ○ | ○ | ○ |
| Oxidation and Abrasion Resistance Test | × | ○ | ○ | ○ | ○ | ○ | ○ | ○ |

FIG. 6

TABLE 2

| | Comparative Sample | Inventive Sample | Inventive Sample | Inventive Sample | Inventive Sample | Inventive Sample | Inventive Sample | Inventive Sample | Inventive Sample | Inventive Sample |
|---|---|---|---|---|---|---|---|---|---|---|
| | 4 | 6 | 7 | 8 | 9 | 10 | 11 | 12 | 13 |
| Addition Amount of Al (mass%) | 6 | 6 | 6 | 6 | 6 | 4 | 4 | 23 | 23 |
| Heat Treatment Temperature (°C) | 800 | 800 | 800 | 800 | 800 | 800 | 800 | 800 | 800 |
| Al₂O₃ (mass%) | 95 | 94 | 91 | 85 | 83 | 96 | 87 | 83 | 74 |
| Al (mass%) | 3.9 | 3.8 | 3.9 | 3.7 | 3.7 | 2 | 2 | 15 | 15 |
| F.C. (mass%) | 0 | 1 | 4 | 10 | 12 | 1 | 10 | 1 | 10 |
| Others (mass%) | 1.1 | 1.2 | 1.1 | 1.3 | 1.3 | 1 | 1 | 1 | 1 |
| Bulk Specific Gravity | 3.3 | 3.2 | 3.1 | 3 | 3 | 3.3 | 3.1 | 3.2 | 3 |
| Apparent Porosity (%) | 11.5 | 13.5 | 13.5 | 13.8 | 13.9 | 10.2 | 12.5 | 10.9 | 12.6 |
| Permeability (× 10⁻¹⁶ m²) | 4.2 | 9 | 5.3 | 6.5 | 8.1 | 5.5 | 6.1 | 2.9 | 7 |
| Presence or Absence of Dense Surface Layer after Heat Treatment in Carbonaceous Material at 1500°C | × | ○ | ○ | ○ | ○ | ○ | ○ | ○ | ○ |
| Presence or Absence of Crack | ○ | ○ | ○ | ○ | ○ | ○ | ○ | ○ | ○ |
| Thermal Shock Resistance Test | × | ○ | ○ | ○ | ○ | ○ | ○ | ○ | ○ |
| Attack Resistance Test | × | ○ | ○ | ○ | × | ○ | ○ | ○ | ○ |
| Oxidation and Abrasion Resistance Test | ○ | ○ | ○ | ○ | ○ | ○ | ○ | ○ | ○ |

FIG. 7

TABLE 3

| | Inventive Sample 14 | Inventive Sample 15 | Inventive Sample 16 | Comparative Sample 5 |
|---|---|---|---|---|
| Addition Amount of Al (mass%) | 6 | | | 5 |
| Addition Amount of Al-Si alloy (mass%) | | 6 | | |
| Addition Amount of Al-Mg alloy (mass%) | | | 6 | 6 |
| Addition Amount of Si (mass%) | 0.5 | 0.5 | 0.5 | |
| Heat Treatment Temperature (°C) | 250 | 250 | 250 | 250 |
| $Al_2O_3$ (mass%) | 89 | 89 | 89 | 89 |
| Al (mass%) | 6 | 4.5 | 3 | 0 |
| F.C. (mass%) | 4 | 4 | 4 | 4 |
| Others (mass%) | 1 | 2.5 | 4 | 7 |
| Bulk Specific Gravity | 3.2 | 3.2 | 3.2 | 3.1 |
| Apparent Porosity (%) | 7.4 | 6.8 | 7.6 | 7.8 |
| Permeability ($\times 10^{-16}\ m^2$) | 2.4 | 2.8 | 4 | 3.6 |
| Presence or Absence of Dense Surface Layer after Heat Treatment in Carbonaceous Material at 1500°C | ○ | ○ | ○ | × |
| Presence or Absence of Crack | ○ | ○ | ○ | ○ |
| Thermal Shock Resistance Test | ○ | ○ | ○ | ○ |
| Attack Resistance Test | ○ | ○ | ○ | × |
| Oxidation and Abrasion Resistance Test | ○ | ○ | ○ | ○ |

FIG. 8

TABLE 4

| | Comparative Sample | Inventive Sample | Inventive Sample | Inventive Sample | Inventive Sample | Inventive Sample | Comparative Sample | Comparative Sample |
|---|---|---|---|---|---|---|---|---|
| | 6 | 17 | 18 | 19 | 20 | 21 | 7 | 8 |
| Addition Amount of Al (mass%) | 6 | 6 | 6 | 6 | 6 | 6 | 6 | 6 |
| Heat Treatment Temperature (°C) | 800 | 800 | 800 | 800 | 800 | 800 | 800 | 800 |
| $Al_2O_3$ (mass%) | 91 | 91 | 91 | 91 | 91 | 91 | 90 | 91 |
| Al (mass%) | 3.2 | 3.3 | 3.7 | 4 | 4 | 4.1 | 4.4 | 4 |
| F.C. (mass%) | 4 | 4 | 4 | 4 | 4 | 4 | 4 | 4 |
| Others (mass%) | 1.8 | 1.7 | 1.3 | 1 | 1 | 0.9 | 1.6 | 1 |
| Bulk Specific Gravity | 3.3 | 3.3 | 3.2 | 3.1 | 3.1 | 3.1 | 3 | 3.1 |
| Apparent Porosity (%) | 7.8 | 9.4 | 11.9 | 13.3 | 13.7 | 14 | 15.8 | 14.7 |
| Permeability ($\times 10^{-16}$ m$^2$) | 0.8 | 1 | 3.7 | 6.5 | 9.1 | 15 | 18.2 | 25.9 |
| Presence or Absence of Dense Surface Layer after Heat Treatment in Carbonaceous Material at 1500°C | × | ○ | ○ | ○ | ○ | ○ | × | × |
| Presence or Absence of Crack | ○ | ○ | ○ | ○ | ○ | ○ | ○ | ○ |
| Thermal Shock Resistance Test | ○ | ○ | ○ | ○ | ○ | ○ | ○ | ○ |
| Attack Resistance Test | ○ | ○ | ○ | ○ | ○ | ○ | × | × |
| Oxidation and Abrasion Resistance Test | ○ | ○ | ○ | ○ | ○ | ○ | ○ | ○ |

FIG. 9

TABLE 5

| | Inventive Sample | Inventive Sample | Inventive Sample | Comparative Sample | Comparative Sample |
|---|---|---|---|---|---|
| Addition Amount of Al (mass%) | 22 | 23 | 24 | 9 | 10 |
| Heat Treatment Temperature (°C) | 250 | 500 | 750 | 1000 | 1250 |
| $Al_2O_3$ (mass%) | 89 | 89 | 92 | 94 | 95 |
| Al (mass%) | 6 | 5.9 | 3 | 0.8 | 0 |
| F.C. (mass%) | 4 | 4 | 4 | 4 | 4 |
| Others (mass%) | 1 | 1.1 | 1 | 1.2 | 1 |
| Bulk Specific Gravity | 3.2 | 3.2 | 3.3 | 3.3 | 3.3 |
| Apparent Porosity (%) | 7.4 | 9.8 | 9.3 | 8.9 | 7.6 |
| Permeability ($\times 10^{-16}$ m²) | 2.4 | 1.6 | 1.3 | 1.2 | 1 |
| Presence or Absence of Dense Surface Layer after Heat Treatment in Carbonaceous Material at 1500°C | ○ | ○ | ○ | × | × |
| Presence or Absence of Crack | ○ | ○ | ○ | ○ | ○ |
| Thermal Shock Resistance Test | ○ | ○ | ○ | ○ | ○ |
| Attack Resistance Test | ○ | ○ | ○ | × | × |
| Oxidation and Abrasion Resistance Test | ○ | ○ | ○ | ○ | ○ |

FIG. 10

TABLE 6

| | Inventive Sample 25 | Inventive Sample 26 | Inventive Sample 27 | Inventive Sample 28 | Inventive Sample 29 | Inventive Sample 30 |
|---|---|---|---|---|---|---|
| Addition Amount of Corundum (mass%) | 88 | 78 | 78 | 78 | 78 | 78 |
| Addition Amount of Alumina-Zirconia (mass %) | | 10 | | | | |
| Addition Amount of Zirconia-Mullite (mass%) | | | 10 | | | |
| Addition Amount of Spinel (mass%) | | | | 10 | 10 | 10 |
| Addition Amount of Magnesia (mass%) | | | | | | |
| Addition Amount of Al (mass%) | 6 | 6 | 6 | 6 | 6 | 6 |
| Heat Treatment Temperature (°C) | 800 | 800 | 800 | 800 | 800 | 800 |
| $Al_2O_3$ (mass%) | 92 | 88 | 86 | 89 | 82 | 4 |
| $SiO_2$ (mass%) | | | 1.7 | | | |
| $ZrO_2$ (mass%) | | 4 | 3.7 | | | |
| MgO (mass%) | | | | 2.3 | 10 | 88 |
| Al (mass%) | 3.2 | 3.2 | 3.2 | 3.2 | 3.2 | 3.2 |
| F.C. (mass%) | 4 | 4 | 4 | 4 | 4 | 4 |
| Others (mass%) | 0.8 | 0.8 | 1.4 | 1.5 | 0.8 | 0.8 |
| Bulk Specific Gravity | 3.2 | 3.4 | 3.4 | 3.2 | 3.2 | 3.1 |
| Apparent Porosity (%) | 10.2 | 10.8 | 10.6 | 10.5 | 10.9 | 10.0 |
| Permeability ($\times 10^{-16}$ m$^2$) | 3.3 | 5.4 | 5.9 | 4.6 | 6.4 | 3.5 |
| Presence or Absence of Dense Surface Layer after Heat Treatment in Carbonaceous Material at 1500°C | ○ | ○ | ○ | ○ | ○ (spinel) | ○ (spinel) |
| Presence or Absence of Crack | ○ | ○ | ○ | ○ | ○ | ○ |
| Thermal Shock Resistance Test | ○ | ○ | ○ | ○ | ○ | ○ |
| Attack Resistance Test | ○ | ○ | ○ | ○ | ○ | ○ |
| Oxidation and Abrasion Resistance Test | ○ | ○ | ○ | ○ | ○ | ○ |

FIG. 11

TABLE 7

| | Inventive Sample 31 | Inventive Sample 32 | Inventive Sample 33 | Inventive Sample 34 |
|---|---|---|---|---|
| Addition Amount of Al (mass%) | 6 | 6 | 6 | 6 |
| Heat Treatment Temperature (°C) | 800 | 800 | 800 | 800 |
| $Al_2O_3$ (mass%) | 89 | 87 | 91 | 86 |
| Al (mass%) | 3.2 | 3.2 | 3.2 | 3.2 |
| F.C. (mass%) | 4 | 4 | 4 | 4 |
| $SiO_2$ (mass%) | 3 | | | |
| SiC (mass%) | | 5 | | |
| $B_4C$ (mass%) | | | 1 | 6 |
| Others (mass%) | 0.8 | 0.8 | 0.8 | 0.8 |
| Bulk Specific Gravity | 3.2 | 3.2 | 3.2 | 3.1 |
| Apparent Porosity (%) | 10.9 | 10.3 | 9.7 | 9.7 |
| Permeability ($\times 10^{-16}$ m$^2$) | 4.8 | 4.1 | 3.8 | 3.1 |
| Presence or Absence of Dense Surface Layer after Heat Treatment in Carbonaceous Material at 1500°C | ○ | ○ | ○ | ○ (0.7mm) |
| Presence or Absence of Crack | ○ | ○ | ○ | ○ |
| Thermal Shock Resistance Test | ○ | ○ | ○ | △ |
| Attack Resistance Test | ○ | ○ | ○ | × |
| Oxidation and Abrasion Resistance Test | ○ | ○ | ○ | ○ |

FIG. 12

REFRACTORY PRODUCT FOR CASTING OF STEEL, AND PLATE FOR SLIDING NOZZLE DEVICE

TECHNICAL FIELD

The present invention relates to a refractory product for casting of steel, and a plate for a sliding nozzle device, using the refractory product. The present invention also relates to a production method for the refractory product.

BACKGROUND ART

In the current situation where a secondary refining in a ladle and continuous casting have become common, a plate for a sliding nozzle device (this plate will hereinafter be referred to as "sliding nozzle plate", and a refractory product for use as the sliding nozzle plate will hereinafter be referred to as "plate refractory product") serving as a member for controlling the flow rate of molten steel is widely employed as an essential refractory product in the iron and steel industry. Since this sliding nozzle plate is a device component for governing control of a molten steel flow, it requires sophisticated performance, and, in terms of material properties, requires having excellent properties capable of coping with various severe conditions, in good balance. Specifically, the sliding nozzle plate undergoes physical actions such as sudden thermal shock and abrasion due to a molten steel flow, chemical attack (corrosion) due to molten steel and molten slag, composite attack (erosion) of chemical and physical actions, etc. Thus, the sliding nozzle plate is required to be a product which is excellent in terms of properties, such as thermal shock resistance, abrasion resistance, attack (corrosion/erosion) resistance, and strength property. With a view to imparting the above properties to the sliding nozzle plate in good balance, an alumina-carbon based refractory product having the most-stable durability is widely used.

As means to improve the attack resistance, for example, in the following Patent Document 1, there is proposed a plate refractory product, called "unburnt or light-burnt product" (the "unburnt" and "light-burnt" will hereinafter be referred to collectively as "unburnt") obtained through addition of a low-melting-point metal having a melting point of 1000° C. or less and heat treatment in a temperature range of 100 to 800° C. An advantage of the unburnt plate refractory product includes high hot strength and attack resistance against molten steel, based on addition of metal in a large amount. When the refractory product comes into contact with molten steel, a microstructure in the vicinity of a working surface of the refractory product is densified by reaction products of the metal, thereby suppressing infiltration of slag. For this reason, the unburnt plate refractory product has a feature of exhibiting excellent slag resistance. On the other hand, it has a disadvantage that the microstructure is excessively densified due to heat receiving during casting, leading to significantly high elastic modulus and deterioration in thermal shock resistance. As a result, there is a problem, such as a situation where edge chipping or thermal shock-causing crack is more likely to occur.

With regard to densification of the microstructure, in the following Non-Patent Publication 1 discloses an alumina-carbon based refractory product in which metal aluminum is added in an amount of 6 mass % or more, and a phenomenon that heat receiving during casting causes a rise in aluminum partial pressure in an inside region of the refractory product, and, due to a resulting difference in aluminum partial pressure between the inside region of the refractory product and a surface region of the refractory product, gaseous aluminum diffuses toward the surface region, and reacts with an oxygen component in the surface region to form a continuous, dense surface layer consisting primarily of alumina. This dense surface layer functions to suppress infiltration of slag and steel. As above, the Non-Patent Publication 1 discloses a technique of realizing high attack resistance based on a dense layer formed in a working surface region of a refractory product. However, in the Non-Patent Publication 1, a condition for facilitating the formation of the dense surface layer is discussed with regard to only the addition amount of metal aluminum. That is, discussion about factors other than the addition amount of metal aluminum is insufficient.

The following Patent Document 2 discloses a carbon-containing refractory product which contains metal silicon having a particle size of 10 μm or less, in an amount of 0.1 to 20 mass %. This carbon-containing refractory product is described as having the following effect: "through a gas-phase reaction of the metal silicon, mutually tangled irregular whiskers of silicon carbide are produced in voids in the refractory microstructure, so that it becomes possible to densify the refractory microstructure to obtain higher strength, and simultaneously reduce pores in terms of number and size to suppress permeation or penetration of oxidizing gas, thereby reducing an oxidative wear rate of the refractory product". However, such a silicon compound easily reacts with slag components and inclusions in molten steel to form a low-melting-point substance, i.e., it is incapable of suppressing infiltration of slag.

The following Patent Document 3 discloses a carbon-containing refractory product characterized in that it comprises a carbon-containing refractory body, and a coating material applied to a surface of the carbon-containing refractory body, wherein the coating material contains aluminum in an amount of 6 to 30 mass %. At a temperature of less than about 600° C. at which aluminum starts being oxidized, aluminum foils dispersedly existing in the coating material are strongly bonded to each other through a resin component of the coating material to ensure gas-tightness. On the other hand, at a temperature of about 600° C. or more, through an oxidation reaction of the aluminum, a thin film layer of alumina is formed as a dense layer over the surface of the refractory body. This carbon-containing refractory product is described as having the following effect: "penetration of oxidizing gas into the refractory body can be blocked by the aluminum foils and the thin film layer of alumina, thereby preventing oxidation of carbon in the refractory body." However, when this carbon-containing refractory product is used as a casting refractory product to be subjected to a molten steel flow, there is a problem that an aluminum foil layer (layer of the aluminum foils) is easily melted, causing peel-off of the aluminum foil layer.

CITATION LIST

Parent Document

Patent Document 1: JP S60-029664B
Patent Document 2: JP S63-285168A
Patent Document 3: JP H10-245282A

Non-Patent Document

Non-Patent Document 1: Proceedings of the 2nd meeting of the committee of refractories for steel industry, Nov. 19, 2014, p.165 to p. 173

SUMMARY OF INVENTION

Technical Problem

As mentioned above, there have been tried many attempts to, through a reaction occurring in an active raw material existing in a surface or inside region of a refractory product when the active raw material receives heat, densify the surface or inside region of the refractory product to enhance strength and oxidation resistance, thereby improving the attack resistance against molten steel. However, the above conventional techniques fail to efficiently or sufficiently form a dense surface layer which is high in terms of a slag infiltration suppressing ability and strong.

A technical problem to be addressed by the present invention is to form a dense surface layer which is high in terms of a slag infiltration suppressing ability and strong, in a surface region of a refractory product efficiently or sufficiently or in an optimum state.

Solution to Technical Problem

According to a first aspect of the present invention, there is provided a refractory product for casting of steel, as described in any one of the following sections 1 to 4. Further, according to a second aspect of the present invention, there is provided a plate for a sliding nozzle device, as described in the following section 5.

1. A refractory product for casting of steel, which contains 1 mass % or more of free carbon, and 2 mass % to 15 mass % of an aluminum component as metal, with the remainder comprising a refractory material as a main composition, wherein the refractory product has a permeability of $1 \times 10^{-16} m^2$ to $15 \times 10^{-16} m^2$.

2. The refractory product as described in the section 1, wherein the aluminum component as metal is derived from one or more selected from the group consisting of metal aluminum, an aluminum-silicon alloy, and an aluminum-magnesium alloy.

3. The refractory product as described in the section 1 or 2, wherein the refractory material is one or more selected from the group consisting of corundum, mullite, zirconia-mullite, sillimanite, alumina-zirconia, spinel, and magnesia.

4. The refractory product as described in any one of the sections 1 to 3 contains one or more types of compounds having a carbon oxidation prevention effect, in a total amount of 5 mass % or less.

5. A plate for a sliding nozzle device, wherein an entirety or a part of the plate is composed of the refractory product as claimed in any one of the sections 1 to 4, wherein the part of the plate includes a region configured to come into contact with molten steel.

The present invention provides a refractory product containing an aluminum component as metal (this aluminum component will hereinafter be also referred to as "metal aluminum"), wherein it is intended to cause, through heat receiving, a difference in aluminum partial pressure between a surface region of the refractory product and an inside region of the refractory product to facilitate diffusion of gaseous aluminum in the inside region toward the surface region of the refractory product, thereby forming a dense layer consisting primarily of alumina, in the surface region of the refractory product to suppress infiltration of slag and steel into the refractory product.

During casting, portions of the refractory product around a nozzle hole and in the vicinity of a sliding surface are exposed to high temperature conditions of 1000° C. or more, so that the metal aluminum existing in the inside region of the refractory product is melted and gasified by heat receiving during casting, and the resulting gaseous aluminum directly reacts with the carbon of the refractory product to form $Al_4C_3$ (s (solid)) (the following formula 1), or reacts with carbon monoxide generated inside the refractory product to form $Al_2O_3$ (s), $Al_4O_4C$ (s) and $Al_2OC$ (s) (the following formulas 2 to 4).

Al (l (liquid) or g (gas))+C(s)=$Al_4C_3$(s)     Formula 1

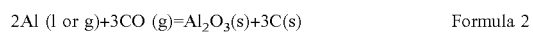

2Al (l or g)+3CO (g)=$Al_2O_3$(s)+3C(s)     Formula 2

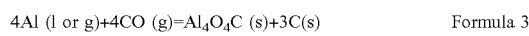

4Al (l or g)+4CO (g)=$Al_4O_4C$ (s)+3C(s)     Formula 3

2Al (l or g)+CO(g)=$Al_2OC$(s)     Formula 4

Through the reactions according to the formulas 2 to 4, a CO partial pressure in the inside of the refractory microstructure is considered to be significantly reduced. Equilibrium partial pressures of vapor-phase species with respect to a CO partial pressure ($P_{CO}$) at 1800 K which is an assumed temperature of the vicinity of the sliding surface, are shown in FIGS. 1, 2 and 3. Since the surface region of the refractory product comes into contact with oxygen in the air or oxygen in molten steel, the CO partial pressure in the surface region of the refractory product is considered to become greater than that in the inside region of the refractory product. Thus, an Al (g) partial pressure ($P_{Al}$) and an $Al_2O$ (g) partial pressure ($P_{Al2O}$) (the Al (g) partial pressure and the $Al_2O$ (g) partial pressure will hereinafter be also referred to simply as "aluminum partial pressure") in the inside region of the refractory product are greater than a respective one of an Al (g) partial pressure and an $Al_2O$ (g) partial pressure in the surface region of the refractory product in the vicinity of an interface, so that Al (g) and $Al_2O$ (g) are considered to be likely to diffuse from the inside region of the refractory product toward the interface in accordance with the difference in aluminum partial pressure. The Al (g) and $Al_2O$ (g) diffusingly reaching a working surface region are considered to react with carbon monoxide in the vicinity of the interface to form a dense surface layer consisting primarily of $Al_2O_3$ which is more stable. For example, in a case where magnesia is comprised in the refractory product, a dense surface layer comprising $MgO.Al_2O_3$ spinel is formed.

In order to form a dense layer in the surface region of the refractory product in the above manner, it is necessary to, under the condition that the refractory product contains free carbon in an amount of 1 mass % or more, raise the aluminum partial pressure in the inside region of the refractory product to increase a difference in aluminum partial pressure between the inside and surface regions of the refractory product. Here, in order to raise the aluminum partial pressure in the inside region of the refractory product, it is necessary to ensure that metal aluminum remains in the refractory product in a certain amount or more, until just before the refractory product receives heat during casting, and set the permeability of the refractory product to fall within an optimal range.

According to empirical knowledge of the present inventors obtained by averaging previous experimental results and results of evaluation of used refractory products after being subjected to actual casting operation, $Al_4C_3$, $Al_4O_4C$ and $Al_2OC$ are formed in a refractory product containing metal aluminum in an amount of 2 mass % or more, after being subjected to heating at 1500° C. which is set by assuming a temperature at a working surface of the refractory product during casting, or after being used in actual casting operation. That is, it can be inferred that the aluminum partial pressure is raised in the inside region of the refractory product containing metal aluminum in an amount of 2 mass % or more, as shown in FIGS. 1 to 3. On the other hand, in a refractory product containing metal aluminum in an amount of less than 2 mass %, no formation of $Al_4C_3$, $Al_4O_4C$ and $Al_2OC$ was observed. This shows that the aluminum partial pressure in the inside region of this refractory product is relatively low. Therefore, the refractory product needs to contain metal aluminum in an amount of 2 mass % or more so as to adequately raise the aluminum partial pressure in the inside region thereof.

If the refractory product contains metal aluminum in an amount of greater than 15 mass %, it is not always guaranteed that the dense surface layer is formed thickly and strongly. Further, in this case, for example, in a region of a plate refractory product in the vicinity of a molten steel contact surface of an inner bore thereof where a temperature increase rate becomes larger, the amount of metal aluminum melting and migrating before being partially vaporized increases, so that a resulting void or a resulting microstructural gap with a portion forming a compound such as oxide is more likely to cause strain in the refractory microstructure, and expansion due to oxidation of the metal aluminum or the like is more likely to cause destruction of the refractory microstructure. Therefore, the content of metal aluminum needs to be 15 mass % or less.

Free carbon is required to develop the aforementioned reaction of metal aluminum. The content of free carbon is set to 1 mass % or more. This makes it possible to form a dense surface layer having a desired thickness. With regard to the formation of the dense surface layer, the upper limit of the content of free carbon needs not be particularly set. However, considering that an excessively large content of free carbon causes deterioration in oxidation and abrasion resistance or the like, and thus exerts a great influence on durability of a refractory product for casting, particularly for a sliding nozzle, the upper limit of the content of free carbon is preferably 10 mass % or less.

It has been found that control of permeability of the refractory product is important for raising the aluminum partial pressure in the refractory product. If the permeability is excessively high, CO gas in the surface region of the refractory product can easily intrude into the inside region of the refractory product, so that a difference in CO partial pressure between the inside and surface regions of the refractory product is less likely to be created, and thus the aluminum partial pressure in the inside region of the refractory product is less likely to be raised. On the other hand, if the permeability is excessively low, even when a difference in partial pressure between the inside and surface regions of the refractory product, gaseous aluminum (Al (g), $Al_2O$ (g)) is less likely to diffuse toward the surface region of the refractory product, so that the reactions expressed by the formulas 1 to 4 are induced before the gaseous aluminum reaches the surface region of the refractory product, resulting in failing to form a dense surface layer in the surface region.

According to empirical knowledge of the present inventors obtained by averaging previous experimental results, in order to raise the aluminum partial pressure in the inside region of the refractory product, it is necessary to increase a difference in CO partial pressure between the surface and inside regions of the refractory product, and make it difficult for CO in the surface region of the refractory product to intrude into the inside region of the refractory product. When the permeability of the refractory product is equal to or less than $15 \times 10^{-16} m^2$, CO in the surface region of the refractory product is less likely to intrude into the inside region of the refractory product, so that the aluminum partial pressure in the inside region of the refractory product becomes more likely to be raised.

The permeability in this specification is a value measured by the "testing method for permeability to gases of refractory products" described in JIS R 2115.

As above, the present invention provides a refractory product which is capable of ensuring that metal aluminum remains therein until just before the refractory product receives heat during casting, and has an optimal permeability.

By ensuring that metal aluminum remains in a certain amount or more, and setting the permeability of the refractory product to fall within an optimal range, it becomes possible to form a dense surface layer in the surface region of the refractory product which is in contact with molten steel during casting, continuously during approximately the entire period of the casting, thereby suppressing infiltration of slag and steel to improve attacking resistance.

Effect of Invention

The refractory product of the present invention is capable of forming a dense surface layer which is high in terms of a slag infiltration suppressing ability and strong, in the surface region thereof efficiently or sufficiently or in an optimal state.

Thus, when used as a casting refractory product(refractory product for casting of steel), particularly a plate refractory product for a sliding nozzle device, it is possible to improve oxidation resistance, attack (corrosion/erosion) resistance, abrasion resistance and others, to suppress infiltration of in-steel inclusions or the like into the refractory microstructure, and maintain such resistances to extend a usable life of the refractory product.

BRIEF DESCRIPTION OF DRAWINGS

FIG. 6 is Table 1.

FIG. 7 is Table 2.

FIG. 8 is Table 3.

FIG. 9 is Table 4.

FIG. 10 is Table 5.
FIG. 11 is Table 6.
FIG. 12 is Table 7.

DESCRIPTION OF EMBODIMENTS

Figure 1:
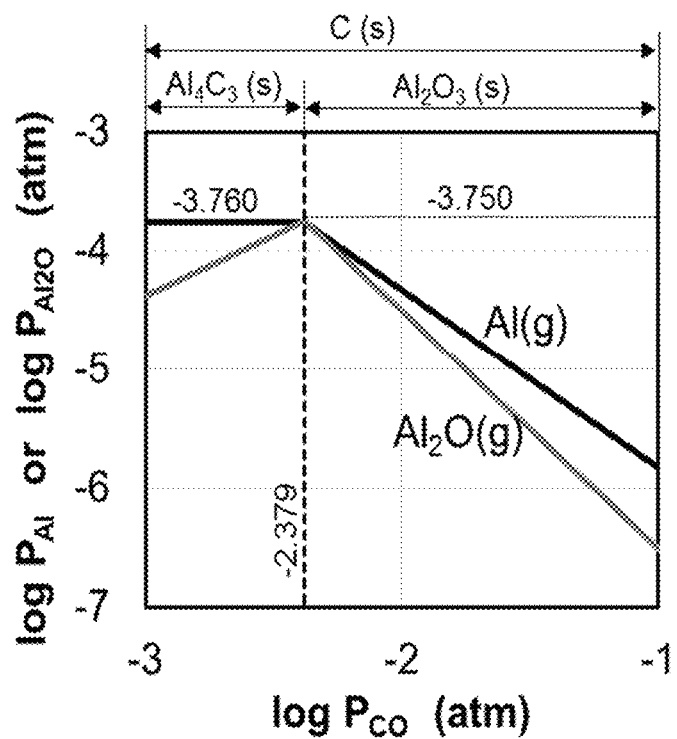
FIG. 1 shows the equilibrium partial pressures of vapor-phase species with respect to Pco at 1800 K (reactions for $Al_2O_3$, $Al_4C_3$, C).
Figure 2:
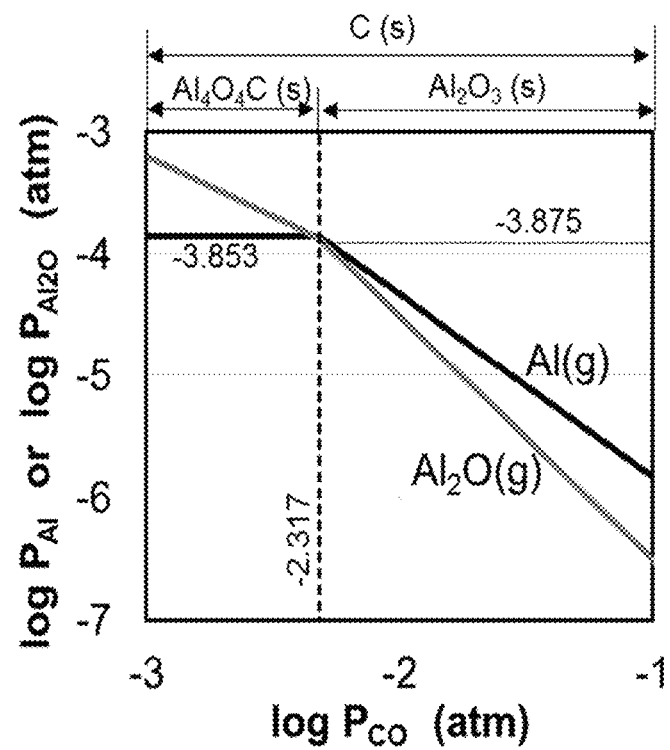
FIG. 2 shows the equilibrium partial pressures of vapor-phase species with respect to Pco at 1800 K (reactions for $Al_2O_3$, $Al_4O_4C$ and C).
Figure 3:
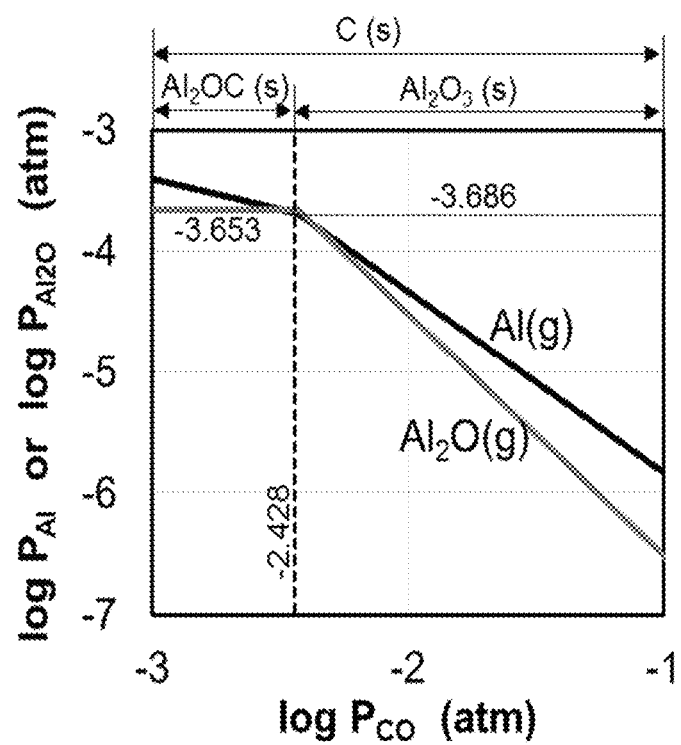
FIG. 3 shows the equilibrium partial pressures of vapor-phase species with respect to Pco at 1800 K (reactions for $Al_2O_3$, $Al_2OC$ and C).

In a refractory product of the present invention, the content of metal aluminum can be adjusted in accordance with an addition amount of metal aluminum as a raw material, a particle size of the raw material metal aluminum and a heat treatment temperature of a raw material mixture. The content of metal aluminum in the refractory product can be set to a certain amount (2 mass % or more), for example, by: preparing a mixture which comprises a raw material containing metal aluminum in an amount greater than that to be required to remain in the refractory product (in an amount of greater than 2 mass %); forming the mixture into a shaped body; and subjecting the shaped body to heat treatment at a temperature less than 660° C. which is the melting point of metal aluminum, or to no heat treatment, to produce the refractory product.

However, the content of metal aluminum in the refractory product can be set to 2 mass % or more, even if the shaped body is subjected to heat treatment at a temperature equal to or moderately greater than 660° C. which is the melting point of metal aluminum. According to empirical knowledge of the present inventors obtained by averaging previous experimental results, it is preferable to set the heat treatment temperature to 800° C. or less.

The metal aluminum in the refractory product may be derived from one or more selected from the group consisting of metal aluminum, an aluminum-silicon alloy, and an aluminum-magnesium alloy.

That is, metal aluminum itself and/or an alloy containing metal aluminum may be used as a raw material, to the extent that satisfies the content (remaining amount) of metal aluminum in the refractory product.

The refractory product of the present invention can be produced by the same fundamental process as that of a conventionally commonly-used shaped refractory product production method.

Specifically, the process comprises steps of: mixing refractory materials (raw materials) in the form of powder or the like at a given ratio; kneading the mixture together with a binder or the like; shaping the kneaded mixture into a given shape under pressure; and subjecting the resulting shaped body to drying and heat treatment, and, when needed, processing.

Particularly, in some applications such as a sledding nozzle plate, the shaped body is impregnated with a liquid, such as tar, capable of leaving carbon after the heat treatment, for the purpose of improving attach resistance and others, in some cases. However, in the refractory product of the present invention, such impregnation is undesirable because it significantly changes permeability to cause a non-uniform distribution of permeability, thereby significantly suppressing migration of Al (g), $Al_2O$ (g), etc., or the like.

In order to set the permeability of the refractory product to fall within the range defined in the appended claims, for example, the following means may be used in a production process for the refractory product or a plate of the present invention, independently or in combination.

1. Adjusting a particle size composition of the mixture
2. Adjusting a ratio of respective fractions of a metal aluminum-containing raw material different in terms of form (atomized form, flake form, etc.) or particle size, in addition to the absolute amount of the metal aluminum-containing raw material
3. Adjusting the heat treatment temperature
4. Adjusting fillability of the mixture based on adjustment of pressure during shaping Examples of a specific method of the means 1 "Adjusting a particle size composition of the mixture" may include classifying a particle size of a refractory material (raw material) mainly comprised in a remainder of the refractory product other than metal aluminum, into a large fraction (e.g., from greater than 1 mm to 3 mm), a medium fraction (e.g., from greater than 0.2 mm to 1 mm), and a small fraction (e.g., 0.2 mm or less), by reference to a packed structure in accordance with the laws pertaining to the closest packing by Andreasen, et al., and adjusting a composition ratio of the fractions.

Examples of a specific method of the means 2 "Adjusting a ratio of respective fractions of a metal aluminum-containing raw material different in terms of form (atomized form, flake form, etc.) or particle size, in addition to the absolute amount of the metal aluminum-containing raw material" may include: adding metal aluminum having a relatively large particle size as a part of the metal aluminum-containing raw material; increasing the absolute amount of the metal aluminum-containing raw material; changing a ratio of the atomized fraction and the flake fraction capable of melting earlier and dispersing more easily among particles as comparted to the atomized fraction, and a total amount of them; and adding an aluminum alloy, such as an aluminum-magnesium alloy, having a melting point lower than that of aluminum, and adjusting the particle size, amount, etc., of the aluminum alloy.

Examples of a specific method of the means 3 "Adjusting the heat treatment temperature" which has a relationship with the means 2 may include adjusting the temperature and time period of the heat treatment to adjust a remaining rate of metal aluminum, and microstructural denseness, i.e., permeability.

Examples of a specific method of the means 4 "Adjusting fillability of the mixture based on adjustment of pressure during shaping" may include increasing or reducing a maximum load, the number of times of stamping during shaping, or the like.

The content of metal aluminum in the refractory product may be determined by X-ray diffraction measurement. In after-mentioned Examples, with a view to minimizing disturbance to enhance accuracy, standard samples of various patterns were prepared, and calibration curves thereof were created to perform quantitative analysis by an internal reference method.

The refractory material comprised in the remainder of the refractory product may be one or more selected from the group consisting of corundum, mullite, zirconia-mullite, sillimanite, alumina-zirconia, spinel, and magnesia.

A casting refractory product, particularly a plate refractory product for a sliding nozzle plate, needs to have attack resistance, thermal shock resistance, abrasion resistance, infiltration resistance against slag or the like, etc., wherein a major component satisfying these resistances includes a refractory material consisting primarily of an $Al_2O_3$ component, and magnesia, which are commonly used in casting refractory products. Among the above refractory materials, it is preferable to use, as a primary component, corundum or spinel which is excellent in terms of attack resistance, abrasion resistance and thermal shock resistance, in combination with one or more of mullite, zirconia-mullite, sillimanite, alumina-zirconia, etc., as a minor component. Further, for example, in a refractory product for casting of molten steel of a steel grade such as Ca-containing steel, or molten steel with a slag composition, requiring higher attack resistance, it is preferable to add magnesia, or increase the amount of magnesia, according to the degree of need for attack resistance.

Further, the refractory product may contain one or more types of compounds having a carbon oxidation prevention effect, in a total amount of 5 mass % or less.

Here, the compound having a carbon oxidation prevention effect means a secondary component commonly contained in a casting refractory product for the purpose of oxidation prevention under high temperatures or the like, and specific examples thereof include SiC, $Si_3N_4$, a boron-containing compound, and any $SiO_2$ compound other than the above refractory materials.

The above boron-containing compound means BN, $B_4C$, borate, a borate-based vitrified component (including frit) or the like, and the $SiO_2$ compound other than the above refractory materials means silicate, a silicate-based vitrified component (including frit), any $SiO_2$-containing mineral (quartz, cristobalite, tridymite, amorphous silica, kaolinite or the like) other than minerals, containing the above $SiO_2$ component, or the like.

These compounds have mainly a function of preventing oxidation of carbon in the refractory product. However, if the total content of the one or more compounds becomes greater than 5 mass %, attack resistance is likely to be largely deteriorated due to a reaction of the refractory product with molten steel and inclusions and others in the molten steel, thereby leading to deterioration in durability of the refractory product. Further, if the metal aluminum in the refractory product is coated with the one or more compounds, the migration of Al (g), $Al_2O$ (g), etc., is likely to be suppressed.

Further, when molten steel in contact with a surface region of the refractory product, or a compound migrated from an inside region of the refractory product, such as a silicon-containing compound, a boron-containing compound or CaO, which is capable of reacting with alumina to form a low-melting-point substance or a vitrified substance, reacts with a dense surface layer formed in the surface region of the refractory product and consisting primarily of alumina, the thickness of the dense surface layer is likely to increase. According to empirical knowledge of the present inventors, if the thickness of the dense surface layer is less than 0.01 mm, the slag infiltration suppressing ability will deteriorate, and, on the other hand, if the thickness of the dense surface layer is greater than 0.5 mm, the dense surface layer becomes highly likely to peel off. The thickness of the dense surface layer becomes larger along with an increase in amount of the low-melting-point substance-forming compound or the vitrified substance-forming compound. Thus, if the total amount of the secondary components such as a silicon-containing compound and a boron-containing compound is greater than 5 mass %, the thickness of the dense surface layer becomes excessively large, possibly leading to peel-off of the dense surface layer. In order to minimize such an undesirable phenomenon, the total amount of the secondary components is preferably set to about 5 mass % or less, more preferably 3 mass % or less, except for inevitable impurities.

The thickness of the dense surface layer formed in the surface region of the refractory product has an influence on attack resistance. If the thickness of the dense surface layer is less than 0.01 mm, the slag infiltration suppressing ability becomes insufficient, and, if the thickness of the dense surface layer is greater than 0.5 mm, the peel-off of the dense surface layer becomes more likely to occur. Further, if the content of the compound having the carbon oxidation prevention effect or the content of impurities as a low-melting-point substance-forming component or the like is excessively large, it is likely to cause the dense surface layer to be formed with an excessively large thickness. In this situation, deterioration in attack resistance is also more likely to occur. Therefore, the thickness of the dense surface layer is preferably set in the range of 0.01 mm to 0.5 mm. This thickness does not mean an average thickness in a specific region, but means that a thinnest part of the dense surface layer has a thickness of 0.01 mm or more, and a thickest part of the dense surface layer has a thickness of 0.5 mm or less.

Figure 4B:
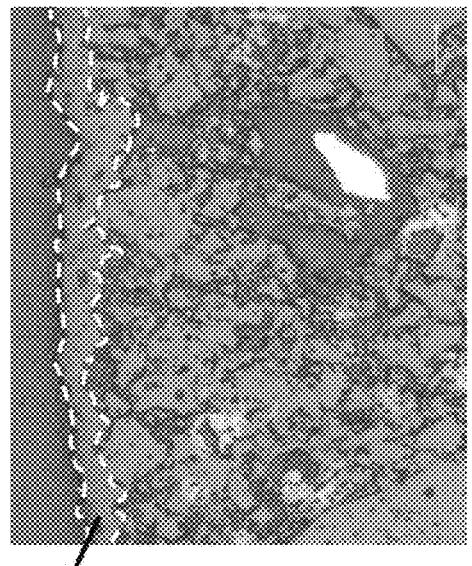
FIG. 4B is a diagram prepared by adding a boundary line between the dense surface layer and an original refractory microstructure, to FIG. 4A.
Figure 5B:
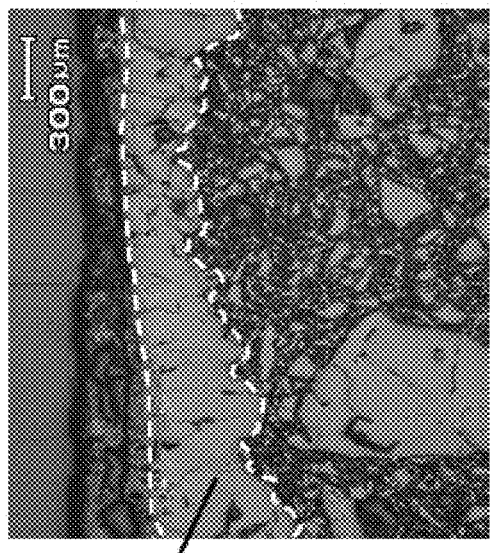
FIG. 5B is a diagram prepared by adding a boundary line between the dense surface layer and an original refractory microstructure, to FIG. 5A.
Figure 4A:
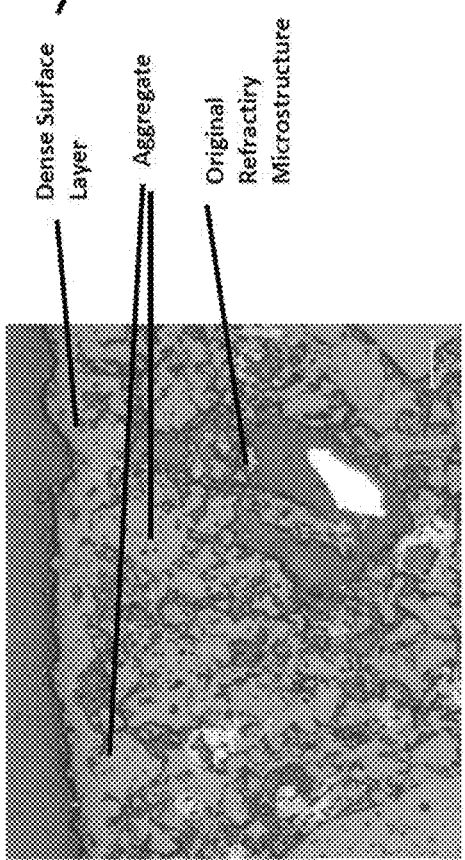
FIG. 4A shows one example of a dense surface layer (having an approximately minimum thickness).
Figure 5A:
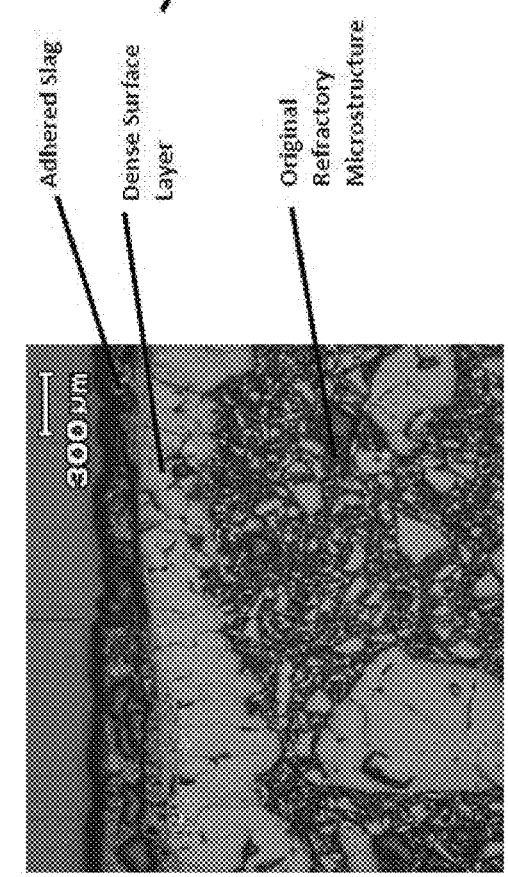
FIG. 5A shows one example of a dense surface layer (having an approximately maximum thickness).

This thickness of 0.01 mm or more is determined based on the thickness of a dense surface layer remaining in a surface region of a used refractory product which was evaluated as good after being subjected to experimental test or actual casting operation, more specifically the thickness of a matrix portion formed as an integral structure, except for protruding areas of aggregate particles (see FIGS. 4A and 4B and FIGS. 5A and 5B).

EXAMPLES

The refractory product of the present invention will be described below, based on inventive samples and comparative samples.

Example A

Example A shows a result obtained by checking an influence of the content of metal aluminum.

Each sample was produced by: mixing an alumina-based refractory raw material consisting primarily of corundum, graphite, metal aluminum, and phenolic resin to prepare a mixture; kneading the mixture using a mixer; forming the kneaded mixture into a shaped body having a shape of a sliding nozzle plate, using a 500-t vacuum oil press; and subjecting the shaped body to heat treatment in a non-oxidative atmosphere at 800° C.

The content of metal aluminum in the produced sample was quantitatively measured by an internal reference method using X-ray diffraction measurement.

First of all, with regard to the presence or absence of formation of a dense surface layer as a solution to the technical problem to be addressed by the present invention, a sample obtained in the above manner was subjected to heat treatment within a carbonaceous material by simulating a used condition of a sliding nozzle plate, i.e., to heat treatment in a reductive atmosphere at 1500° C., and then cooling, and a surface state of the cooled sample at room temperature was observed and evaluated. Here, the dense surface layer means a continuous dense layer formed in a surface region of the sample. When a dense surface layer having a thickness of 0.01 mm or more was formed in a surface region thereof, the sample was evaluated as "◯" indicative of being acceptable. On the other hand, when no dense surface layer was formed, the sample was evaluated as "x" indicative of being inacceptable (a state in which a dense surface layer having a thickness of less than 0.01 mm is formed will hereinafter be also expressed that "no dense surface layer was formed", and the sample is also evaluated as "x").

Further, with regard to an original refractory microstructure of the sample, the presence or absence of crack was visually observed and evaluated. When there is no crack, the sample was evaluated as "○". On the other had, when there is a crack, the sample was evaluated as "x".

Further, a thermal shock resistance test, an attack resistance test and an oxidation and abrasion resistance test were conducted to check other property factors necessary for a refractory product, particularly a refractory product for casting of steel. However, the presence/absence and degree of necessity of each of these property factors are determined based on its intended purpose, application site and the like. Thus, the refractory product needs not necessarily have all the property factors at high levels.

That is, even when one or more of results of the thermal shock resistance test, the attack resistance test and the oxidation and abrasion resistance test of a refractory product are not evaluated as "○", this does not mean that the refractory product cannot be used as a casting refractory product, particularly a plate refractory product, but can be used under casting conditions where these properties are not strongly required, such as a condition that there are few repetitions of a cycle of heating and cooling or there is no repetition of the cycle, a condition that a steel grade to be cast is low in in-steel inclusions or slag components mixed in steel, or a condition that casting is performed in an inert gas atmosphere, i.e., in an atmosphere having a low oxygen concentration.

In the thermal shock resistance test, a sample produced in the above manner and formed into a size of 40×40×160 mm was immersed in molten pig ion at 1600° C. for 3 minutes and then air-cooled. When no peel-off of a dense surface layer occurred, the sample was evaluated as "○". On the other hand, when no peel-off of the dense surface layer occurred but a crack was formed in a part of a boundary area between the dense surface layer and an original refractory microstructure of the sample, the sample was evaluated as "Δ", and, when peel-off of the dense surface layer occurred, the sample was evaluated as "x".

In the attack resistance test, a sample produced in the manner was subjected to a lining attack (corrosion/erosion) testing method under heating at 1600° C. for 3 hours, using common steel and mill scale as an attacking (corrosive/erosive) substance, and evaluated in terms of wear amount. Specifically, on the basis of the inventive sample 1 having an attack resistance which is experientially considered to be a standard or lower-limit value required under commonly-used casting conditions, when the sample had an attack resistance equal to or better than that of the inventive sample 1, it was evaluated as "○". On the other hand, when the sample had an attack resistance worse than that of the inventive sample 1, it was evaluated as "x".

In the oxidation and abrasion resistance test, a sample produced in the above manner was held at 800° C. for 3 hours, and then cooled down to room temperature. Subsequently, the cooled sample was subjected to a BS abrasion test in which SiC abrasive grains are blasted against the surface of the sample, and a rate of change in weight before and after the BS abrasion test. Specifically, on the basis of the comparative sample 1 having an oxidation and abrasion resistance which is experientially considered to be a standard or lower-limit value required under commonly-used casting conditions, when the sample had an oxidation and abrasion resistance equal to or better than that of the comparative sample 1, it was evaluated as "○". On the other hand, when the sample had an oxidation and abrasion resistance worse than that of the comparative sample 1, it was evaluated as "x".

The above conditions are the same in the following Examples B to G.

A composition, an evaluation result, etc., of each sample are shown in Table 1.

In Table 1, the remainder("Others") of the chemical composition consists primarily of an inevitable component as impurities coming from raw materials, such as $SiO_2$, $TiO_2$ and $R_2O$ (where R denotes an alkali metal). The amount of the remainder is extremely small, and exists in the form of a compound. Thus, as long as this amount is about 4 mass % or less, there is not any significant influence on the effects of the present invention. The remainder("Others") of the chemical composition in each of the following Examples B to F is the same as that described above.

In each of the inventive samples 1 to 5 and the comparative sample 3 in which the content of metal aluminum is equal to or greater than 2 mass %, a dense surface layer was formed. However, in the comparative samples 1 and 2 in which the content of metal aluminum is less than 2 mass %, no dense surface layer was formed, and they were evaluated as "x".

In the comparative sample 3 in which the content of metal aluminum is greater than 15 mass %, a dense surface layer was formed, but an increase in void which would be caused by disappearance of a part of the metal aluminum and a crack were observed in the original refractory microstructure.

With regard to attack resistance, each of the inventive samples 1 to 5 and the comparative sample 3 in which a dense surface layer was formed exhibits an excellent evaluation result, i.e., is capable of maintaining a problem-free level.

With regard to thermal shock resistance, each of the inventive samples 1 to 5 and the comparative samples 1 and 2 exhibits an excellent evaluation result. However, the comparative sample 3 in which the content of metal aluminum is greater than 15 mass % exhibits a poor evaluation result (this is deemed to be also due to an influence of the aforementioned crack and/or strain of the original refractory microstructure).

With regard to oxidation and abrasion resistance, each of the inventive samples 1 to 5 and the comparative samples 2 and 3 exhibits an excellent evaluation result. However, the comparative sample 1 in which no metal aluminum is contained exhibits an evaluation result inferior to that of the comparative sample 1.

Example B

Example B is a result obtained by checking an influence of the content of carbon (which means free carbon (F. C.); this will also be applied to the following). A composition, an evaluation result, etc., of each sample are shown in Table 2.

In Example B, the content of carbon was changed in the range of 0 mass % to 12 mass %. In each of the inventive samples 6 to 13 in which the content of carbon is 1 mass % or more, a dense surface layer was formed. However, in the comparative sample 4 in which no carbon is contained, no dense surface layer was formed, and it was evaluated as "x".

With respect to thermal shock resistance, each of the inventive samples 6 to 13 in which the content of carbon is 1 mass % or more exhibits an excellent evaluation result. However, the comparative sample 4 in which no carbon is contained exhibits a poor evaluation result.

With regard to attack resistance, each of the inventive samples 6 to 13 in which the content of carbon is 1 mass % or more, and a dense surface layer was formed exhibits an excellent evaluation result. However, the comparative sample 4 in which no dense surface layer was formed exhibits an evaluation result inferior to that of the inventive sample 1.

With respect to oxidation and abrasion resistance, each of the inventive samples 6 to 8 and 10 to 14 and the comparative example 4 in which carbon is contained in an amount of 10 mass % or less exhibits an excellent evaluation result. However, in the inventive sample 9 in which carbon is contained in an amount of greater than 10 mass % exhibits an evaluation result inferior to that of the comparative sample 1.

Example C

Example C is a result obtained by checking an influence of the type of metal. A composition, an evaluation result, etc., of each sample are shown in Table 3.

In each of the inventive samples 14 to 16 in which metal aluminum, an aluminum-silicon alloy, and an aluminum-magnesium alloy are added, a dense surface layer was formed. However, in the comparative sample 5 in which only silicon is added as metal, no dense surface layer was formed, and it was evaluated as "x".

With respect to thermal shock resistance, each of the inventive samples 14 to 16 and the comparative sample 5 exhibits an excellent evaluation result.

With regard to attack resistance, each of the inventive samples 14 to 16 in which a dense surface layer was formed exhibits an excellent evaluation result. However, the comparative sample 5 in which no dense surface layer was formed exhibits an evaluation result inferior to that of the inventive sample 1.

With respect to oxidation and abrasion resistance, each of the inventive samples 14 to 16 and the comparative example 5 exhibits an excellent evaluation result.

Example D

Example D is a result obtained by checking an influence of permeability. A composition, an evaluation result, etc., of each sample are shown in Table 4.

In each of the inventive samples 17 to 21 in which permeability is from $1 \times 10^{-16} m^2$ to $15 \times 10^{-16} m^2$, a dense surface layer was formed. However, in each of the comparative sample 6 in which permeability is less than $1 \times 10^{-16} m^2$, and the comparative samples 7 and 8 in which permeability is greater than $15 \times 10^{-16} m^2$, no dense surface layer was formed, and they were evaluated as "x".

With respect to thermal shock resistance, each of the inventive samples 17 to 21 and the comparative samples 6 to 8 exhibits an excellent evaluation result.

With regard to attack resistance, each of the inventive samples 17 to 21 in which a dense surface layer was formed and the comparative sample 6 in which permeability is less than $1 \times 10^{-16} m^2$ exhibits an excellent evaluation result. However, each of the comparative samples 7 and 8 in which permeability is greater than $15 \times 10^{-16} m^2$ exhibits an evaluation result inferior to that of the inventive sample 1.

With respect to oxidation and abrasion resistance, each of the inventive samples 17 to 21 and the comparative examples 6 to 8 exhibits an excellent evaluation result.

Example E

Example E is a result obtained by checking an influence of a heat treatment temperature under the condition that the addition amount of metal aluminum is set to a constant value of 6 mass %. A composition, an evaluation result, etc., of each sample are shown in Table 5.

In each of the inventive samples 22 to 24 in which the heat treatment temperature is equal to or less than 750° C. at which the content (remaining amount) of metal aluminum becomes equal to or greater than 2 mass %, a dense surface layer was formed. However, in each the comparative samples 9 and 10 in which the heat treatment temperature is greater than 1000° C. at which the content (remaining amount) of metal aluminum becomes less than 2 mass %, no dense surface layer was formed, and they were evaluated as "x".

With respect to thermal shock resistance, each of the inventive samples 22 to 24 and the comparative samples 9, 10 exhibits an excellent evaluation result.

With regard to attack resistance, each of the inventive samples 22 to 24 in which a dense surface layer was formed exhibits an excellent evaluation result. However, each of the comparative samples 9 and 10 in which no dense surface layer was formed exhibits an evaluation result inferior to that of the inventive sample 1.

With respect to oxidation and abrasion resistance, each of the inventive samples 22 to 24 and the comparative examples 9 and 10 exhibits an excellent evaluation result.

Example F

Example F is a result obtained by checking an influence of refractory aggregate. A composition, an evaluation result, etc., of each sample are shown in Table 6.

In Example F, corundum, alumina-zirconia, zirconia-mullite, spinel, and magnesia were used as the refractory aggregate. In each of the inventive samples 25 to 30, a dense surface layer was formed. Specifically, in each of the inventive samples 25 to 29, an $Al_2O_3$-based dense surface layer was formed, and, in each of the inventive samples 29 and 30, a dense surface layer comprising $MgO.Al_2O_3$ spinel was formed.

With respect to thermal shock resistance, attack resistance and oxidation and abrasion resistance, each of the inventive samples 25 to 30 exhibits an excellent evaluation result, without any influence of a difference in primary component of the dense surface layer.

Example G

Example G is a result obtained by checking an influence of $SiO_2$, SiC or $B_4C$ as examples of the remainder. A composition, an evaluation result, etc., of each sample are shown in Table 7.

In each of the inventive samples 31 to 34, a dense surface layer was formed.

With respect to thermal shock resistance, attack resistance and oxidation and abrasion resistance, each of the inventive samples 31 to 33 exhibits an excellent evaluation result.

In the inventive sample 34, the maximum thickness of the formed dense surface layer was about 0.7 mm which goes beyond a preferred upper limit of 0.5 mm. As a result of the thermal shock resistance test, a crack was formed in a part of a boundary area between the dense surface layer and an original refractory microstructure, and therefore the inventive sample 34 was evaluated as being slightly inferior to the inventive samples 31 to 33. Thus, as a result of the attack resistance test, the inventive sample 34 was evaluated as being inferior to that of the inventive sample 1.

The invention claimed is:

1. A refractory product for casting of steel, the refractory product containing 1 mass % or more of free carbon, and 2 mass % to 15 mass % of an aluminum component as metal, with the remainder comprising a refractory material as a main composition, wherein the refractory product has a permeability of $1\times10^{-16}$ m$^2$ to $15\times10^{-16}$ m$^2$.

2. The refractory product as claimed in claim 1, wherein the aluminum component as metal is derived from one or more selected from the group consisting of metal aluminum, an aluminum-silicon alloy, and an aluminum-magnesium alloy.

3. The refractory product as claimed in claim 1, wherein the refractory material is one or more selected from the group consisting of corundum, mullite, zirconia-mullite, sillimanite, alumina-zirconia, spinel, and magnesia.

4. The refractory product as claimed in claim 1, which contains one or more types of compounds having a carbon oxidation prevention effect, in a total amount of 5 mass % or less.

5. A plate for a sliding nozzle device, wherein an entirety or a part of the plate is composed of the refractory product as claimed in claim 1, wherein the part of the plate includes a region configured to come into contact with molten steel.

6. The refractory product as claimed in claim 2, wherein the refractory material is one or more selected from the group consisting of corundum, mullite, zirconia-mullite, sillimanite, alumina-zirconia, spinel, and magnesia.

7. The refractory product as claimed in claim 2, which contains one or more types of compounds having a carbon oxidation prevention effect, in a total amount of 5 mass % or less.

8. The refractory product as claimed in claim 3, which contains one or more types of compounds having a carbon oxidation prevention effect, in a total amount of 5 mass % or less.

9. The refractory product as claimed in claim 6, which contains one or more types of compounds having a carbon oxidation prevention effect, in a total amount of 5 mass % or less.

10. A plate for a sliding nozzle device, wherein an entirety or a part of the plate is composed of the refractory product as claimed claim 2, wherein the part of the plate includes a region configured to come into contact with molten steel.

11. A plate for a sliding nozzle device, wherein an entirety or a part of the plate is composed of the refractory product as claimed claim 3, wherein the part of the plate includes a region configured to come into contact with molten steel.

12. A plate for a sliding nozzle device, wherein an entirety or a part of the plate is composed of the refractory product as claimed claim 4, wherein the part of the plate includes a region configured to come into contact with molten steel.

13. A plate for a sliding nozzle device, wherein an entirety or a part of the plate is composed of the refractory product as claimed claim 6, wherein the part of the plate includes a region configured to come into contact with molten steel.

14. A plate for a sliding nozzle device, wherein an entirety or a part of the plate is composed of the refractory product as claimed claim 7, wherein the part of the plate includes a region configured to come into contact with molten steel.

15. A plate for a sliding nozzle device, wherein an entirety or a part of the plate is composed of the refractory product as claimed claim 8, wherein the part of the plate includes a region configured to come into contact with molten steel.

16. A plate for a sliding nozzle device, wherein an entirety or a part of the plate is composed of the refractory product as claimed claim 9, wherein the part of the plate includes a region configured to come into contact with molten steel.

* * * * *